Dec. 27, 1932.  J. G. MILLER  1,892,069
PITMAN
Filed July 8, 1932

Inventor
Junius G. Miller
By Clarence A. O'Brien
Attorney

Patented Dec. 27, 1932

1,892,069

UNITED STATES PATENT OFFICE

JUNIUS G. MILLER, OF OSHKOSH, WISCONSIN

PITMAN

Application filed July 8, 1932. Serial No. 621,433.

This invention relates broadly to well drilling apparatus, and more particularly to a pitman for connecting the power crank shaft and spudding beam, and in accordance with the present invention a compensating pitman for the purpose above mentioned is provided with shock absorbing means, is capable of ready adjustment, consists of comparatively few parts, and is otherwise free of objectionable features which characterize pitmen now generally used in this connection.

This invention together with its numerous objects and advantages will be best understood from a study of the following description taken in connection with the accompanying drawing wherein.

Figures 1, 2:
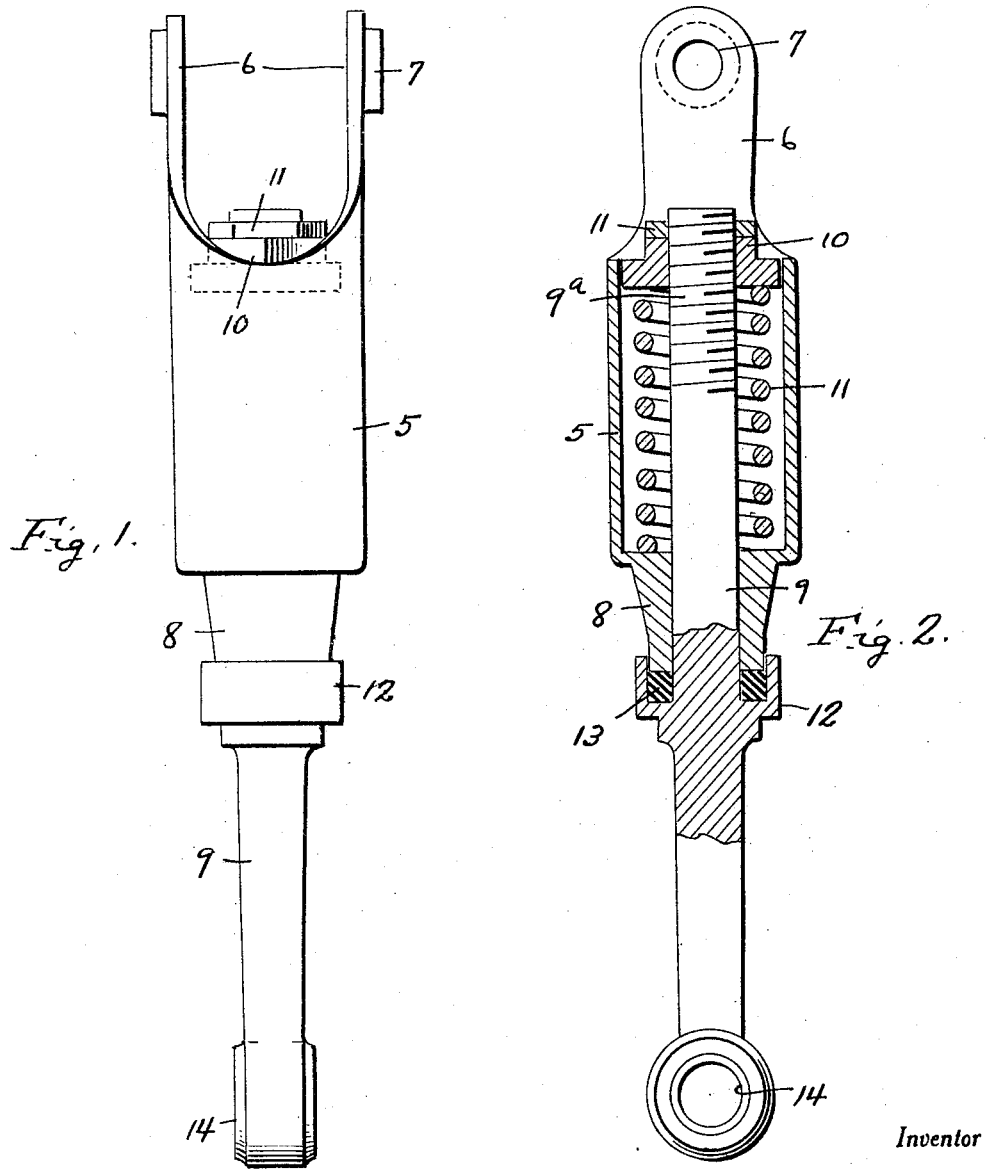
Figure 1 is a front elevational view of the pitman.
Figure 2 is a longitudinal sectional elevational view therethrough.

With reference more in detail to the drawing it will be seen that my improved compensating pitman comprises an upper barrel or tubular portion 5 notched on diametrically opposite sides thereof at its upper end, or otherwise formed to provide at said upper end a pair of spaced parallel coextensive arms or extensions 6 provided with bearings 7 for accommodating pintles or the like usually provided on one end of the spudding beam of a well drilling machine whereby to connect the pitman with the front end of the spudding-beam. At its lower end the barrel or tubular part 5 is provided with an integral tapered pin 8 having an opening extending therethrough.

Movable longitudinally through the opening in the pin 8 is a rod 9 provided on its upper end with threads 9a. Screwed on to the upper end of the rod 9 is a hexagonal nut 10 adapted to reciprocate in the barrel 5 and serving to retain the rod 9 against rotation relative to the barrel. Threaded on the upper end of the rod 9 above the nut 10 is a jamb nut 11 that serves to lock the nut 10 in place and prevent such movement of the nut 10 relative to the rod 9 as would result in the wearing of the threads 9a.

The rod 9 and barrel 5 are normally urged relative to one another in opposite directions through the medium of a spring 11 housed within the barrel 5 and having its upper end bearing against the nut 10 as shown in the drawing.

Upward movement of the rod 9 relative to the barrel 5 is limited through the medium of a cup 12 provided on an intermediate portion of the rod 9, being preferably integral with said rod. The cup 12 receives the free end of the pin 8, and arranged within the cup 12 is a shock absorbing element 13, the same in the present instance being in the nature of an apertured disk of rubber or similar yieldable material. Manifestly the rubber disk 13 serves to absorb shock incident to the expansion of spring 11, and also tends to eliminate the click usually incident to the drawing of the members 5 and 9 toward the limits of their relative movement upon expansion of the spring 11.

At its lower end the rod 9 is provided with a wrist pin bearing 14 to receive the wrist pin usually provided on the crank arm of the band wheel forming part of the well drilling apparatus.

In actual practice the extensions 6 are connected to the front end of the spudding beam and the bearing equipped end 14 of the rod connected with the wrist pin of the crank of the band wheel. Manifestly during operation of the well drilling apparatus the pitman is alternately expanded and contracted, and by an adjustment of the nut 10 the extent of movement of the pitman members 5 and 9 relative to each other is determined as is also the tension of the spring 11.

Also upon contraction of the pitman the pin 8 will abut the washer 13 so that this contraction of the pitman will be accomplished with but minimum jar, and without the usual click or noise incident to the contraction of pitmen now so employed.

Even though I have herein shown and described the preferred embodiment of the invention, it is to be understood that the same is susceptible of further changes, modifications and improvements coming within the scope of the appended claim.

Having thus described my invention, what I claim as new is:

A pitman for well drilling machines comprising in combination a cylindrical barrel open at one end, and closed at its opposite end, oppositely disposed ears integral with the barrel at opposite sides of the open end thereof, and provided with means for connecting them with a beam, a pin integral with the barrel at the closed end thereof, said pin being tapered and having an aperture extending therethrough, a rod extending through the aperture in the pin, a nut threaded on one end of the rod and operating within said barrel, a spring in the barrel and engaging the nut for normally urging the rod in one direction longitudinally of the barrel, a cup-shaped member provided on the rod intermediate the ends of the latter and adapted to receive the smallest end of said pin for limiting movement of said rod in one direction, and an annular washer of resilient material disposed about the rod and fitted within said cup-shaped member for engaging said end of said pin, said rod on the free end thereof being also provided with a wrist pin bearing.

In testimony whereof I affix my signature.

JUNIUS G. MILLER.